United States Patent
Xia et al.

(10) Patent No.: US 9,989,935 B2
(45) Date of Patent: Jun. 5, 2018

(54) ACTIVE FRONT-END RECTIFIER FILTER DELAY COMPENSATION METHOD BASED ON MODEL PREDICTIVE CONTROL

(71) Applicant: Tianjin University, Tianjin (CN)

(72) Inventors: Changliang Xia, Tianjin (CN); Tao Liu, Tianjin (CN); Zhanfeng Song, Tianjin (CN)

(73) Assignee: TIANJIN UNIVERSITY, Tianjin (CN)

(*) Notice: Subject to any disclaimer, the term of this patent is extended or adjusted under 35 U.S.C. 154(b) by 96 days.

(21) Appl. No.: 14/649,209

(22) PCT Filed: Dec. 24, 2012

(86) PCT No.: PCT/CN2012/087245
§ 371 (c)(1),
(2) Date: Jun. 3, 2015

(87) PCT Pub. No.: WO2014/094317
PCT Pub. Date: Jun. 26, 2014

(65) Prior Publication Data
US 2015/0316906 A1   Nov. 5, 2015

(30) Foreign Application Priority Data
Dec. 20, 2012 (CN) .......................... 2012 1 0559389

(51) Int. Cl.
*G06F 19/00* (2011.01)
*G05B 13/04* (2006.01)
(Continued)

(52) U.S. Cl.
CPC ........... *G05B 13/048* (2013.01); *G06F 17/13* (2013.01); *G06F 17/14* (2013.01); *H02J 3/1842* (2013.01); *Y02E 40/22* (2013.01)

(58) Field of Classification Search
CPC ....... G05B 13/048; G06F 17/13; G06F 17/14; H02J 3/1842; Y02E 40/22
See application file for complete search history.

(56) References Cited

U.S. PATENT DOCUMENTS 4,823,251 A    4/1989  Kawabata et al.
8,552,670 B2 * 10/2013  D'Angelo ............... H02P 27/08
                                                        318/254.1
(Continued)

FOREIGN PATENT DOCUMENTS

CN    101615854 A    12/2009
CN    102291023 A    12/2011
(Continued)

OTHER PUBLICATIONS

Lindgren, Michael, and Jan Svensson. "Control of a voltage-source converter connected to the grid through an LCL-filter-application to active filtering." Power Electronics Specialists Conference, 1998. PESC 98 Record. 29th Annual IEEE. vol. 1. IEEE, 1998.*
(Continued)

*Primary Examiner* — Michael D Masinick
(74) *Attorney, Agent, or Firm* — George G. Wang; Bei & Ocean

(57) ABSTRACT

An active front-end rectifier filter delay compensation method based on model predictive control is disclosed. The method includes following steps: detecting a three-phase grid voltage and three-phase input current sampling value of an active front-end rectifier, and transforming both via Clarke transformation to acquire grid voltage sampling values $e_\alpha$ and $e_\beta$, and input current sampling values $i_{f\alpha}$ and $i_{f\beta}$ under a two-phase stationary coordinate system; establishing an equivalent mathematical model of rectifier on the basis of voltage balancing equation (1) in an actual rectifier, and establishing an equivalent filter model on the basis of a transfer function corresponding to the actual filter, thus
(Continued)

constituting a filter delay observer; and, compensating the difference value between the input current sampling values $i_{f\alpha}$ and $i_{f\beta}$, and equivalent current sampling values $i_{of\alpha}$ and $i_{of\beta}$ into an input of the filter delay observer via a proportional controller. In comparison to the input current sampling values $i_{f\alpha}$ and $i_{f\beta}$, the input current observed values $i_{o\alpha}$ and $i_{o\beta}$ of the rectifier are not impacted by a filter latency and are closer to the actual input current value of the rectifier such that the impact of the filter delay is compensated.

1 Claim, 2 Drawing Sheets

(51) Int. Cl.
*G06F 17/14* (2006.01)
*H02J 3/18* (2006.01)
*G06F 17/13* (2006.01)

(56) References Cited

U.S. PATENT DOCUMENTS

| | | |
|---|---|---|
| 2009/0244937 A1 | 10/2009 | Liu |
| 2012/0025745 A1* | 2/2012 | D'Angelo ............... H02P 21/22 318/400.04 |
| 2017/0111000 A1* | 4/2017 | Saito ..................... H02P 29/60 |

FOREIGN PATENT DOCUMENTS

| | | |
|---|---|---|
| CN | 102714413 A | 10/2012 |
| CN | 102723885 A | 10/2012 |
| JP | H 469064 A | 3/1992 |

OTHER PUBLICATIONS

Dannehl, Joerg, Christian Wessels, and Friedrich Wilhelm Fuchs. "Limitations of voltage-oriented PI current control of grid-connected PWM rectifiers with $ LCL $ filters." IEEE Transactions on Industrial Electronics 56.2 (2009): 380-388.*

Saccomando, Giuseppe, and Jan Svensson. "Transient operation of grid-connected voltage source converter under unbalanced voltage conditions." Industry Applications Conference, 2001. Thirty-Sixth IAS Annual Meeting. Conference Record of the 2001 IEEE. vol. 4. IEEE, 2001.*

Li, Yuling, Study on the current-source PWM Rectifier and its control strategies, <Doctoral Dissertation of Zhejiang University>, Mar. 2006.

Wang, Meng et al., A power resonance compensation control strategy for PWM rectifiers under unbalanced grid voltage conditions, <Proceedings of the CSEE>, Jul. 2012, p. 46-53, vol. 32, No. 21.

Li, Chunlong et al., Deadbeat control for current loop of PWM rectifier based on state-observer, <Transactions of China Electrotechnical Society>, Dec. 2006, p. 84-89, vol. 21, No. 12.

Xia, Changliang et al., Robust model predictive current control of three-phase voltage source PWM rectifier with online disturbance observation, <IEEE Transactions on Industrial Informatics>, Aug. 2012, p. 459-471, vol. 8, No. 3.

* cited by examiner

ACTIVE FRONT-END RECTIFIER FILTER DELAY COMPENSATION METHOD BASED ON MODEL PREDICTIVE CONTROL

FIELD OF THE INVENTION

The present invention relates to a filter delay compensation method for an active front-end rectifier based on model predictive control, and belongs to the technical field of power electronic control.

BACKGROUND OF THE INVENTION

The power convertor all-digital control method based on model predictive control has grown rapidly in recent years. MPC (Model predictive control) is a mathematical-model-based control algorithm used for predicting the future response of object to be controlled. The algorithm comprises a value function defined according to the object to be controlled. By minimizing the value function, the optimal voltage vector is obtained for the algorithm during each sampling-period according to sampling-period prediction, and the optimal voltage vector is regarded as the interaction vector for the next period. MPC belongs to a non-linear control technique, and has fast transient response speed due to its no inclusion of linear controller and modulation algorithms. With the fast development of the micro processor and in-depth researching of the relevant techniques, MPC shows great advantages in the application of power electronics and motor driving fields.

MPC is a control algorithm for directly predicting and modulating current, and demands for a higher accuracy for the current to be detected. For eliminating interference, filtering process should be performed to the detected voltage and current signal prior sampling, but the filter will create signal delay while filtering high-frequency interference signal. As the MPC adopts circulation for optimization and non-constant-frequency control mode of outputting directly without modulation, the MPC has the advantage of fast transient response speed, but also has the disadvantages of high sampling frequency, and the system delay, thus affecting the operating performance. When the cut-off frequency of filter is low, signal filtering will suffer from some delay and produce variation between actual output value and set value of system, and further will impact the control effect. Therefore, it is necessary for us to develop a filter delay compensation method for MPC.

SUMMARY OF THE INVENTION

To solve the technical problems in the prior art MPC, the present invention provides a filter delay compensation method for an active front-end rectifier based on model predictive control. The method can effectively eliminate the filter delay impacts on the control system without adding additional equipment, and can remain a better control effects for the active front-end rectifier based on MPC even when a long delay exists in the system.

For solving the above technical problems, the present invention provides a technical scheme as follows:

A filter delay compensation method for an active front-end rectifier based on model predictive control, includes the following steps:

Step 1: detecting a three-phase grid voltage and three-phase input current sampling values of an active front-end rectifier, and transforming both via Clarke transformation to acquire grid voltage sampling values $e_\alpha$ and $e_\beta$, and input current sampling values $i_{f\alpha}$ and $i_{f\beta}$ under a two-phase stationary coordinate system;

Step 2: establishing an equivalent mathematical model of rectifier on the basis of the voltage balancing equation (1) in an actual rectifier;

$$\begin{cases} e_\alpha = u_\alpha + Ri_\alpha + L\dfrac{di_\alpha}{dt} \\ e_\beta = u_\beta + Ri_\beta + L\dfrac{di_\beta}{dt} \end{cases} \quad (1)$$

Wherein, $e_\alpha$ and $e_\beta$ are grid voltage sampling values, $i_\alpha$ and $i_\beta$ are input current values of the rectifier; L and R are input inductance values and equivalent series resistance value respectively; $u_\alpha$ and $u_\beta$ are input voltage values of rectifier;

Establishes an equivalent filter model on the basis of the transfer function corresponding to the actual filter, wherein the ideal transfer function thereof is equation (2) of:

$$F(s) = \frac{b_m s^m + b_{m-1} s^{m-1} + \ldots + b_0}{a_n s^n + a_{n-1} s^{n-1} + \ldots + a_0} \quad (2)$$

wherein, $a_0, a_1 \ldots a_n$ are coefficient of part-denominator of transfer function to the filter; $b_0, b_1 \ldots b_m$ are coefficient of part-numerator of transfer function to the filter; s is the complex variable of transfer function;

The above equivalent mathematical model of rectifier and equivalent filter model constitute a filter delay observer;

Step 3: taking the grid voltage sampling values $e_\alpha$ and $e_\beta$ acquired by step 1 and the rectifier input voltage values $u_\alpha$ and $u_\beta$ acquired by the last sampling period as the input value of the filter delay observer; and obtaining the equivalent rectifier input current values $i_{o\alpha}$ and $i_{o\beta}$ by equivalent mathematical model of rectifier;

Step 4: putting equivalent rectifier input current values $i_{o\alpha}$ and $i_{o\beta}$ into the equivalent filter model, and obtaining equivalent sampling current values $i_{of\alpha}$ and $i_{of\beta}$;

Step 5: compensating the difference value between the input current sampling values $i_{f\alpha}$ and $i_{f\beta}$ acquired by step 1 and equivalent current sampling values $i_{of\alpha}$ and $i_{of\beta}$ acquired by step 4 into an input of the filter delay observer via a proportional controller;

Step 6: inputting the equivalent rectifier input current values $i_{o\alpha}$ and $i_{o\beta}$ which are regarded as the rectifier input current observed values into the model predictive control algorithm, and achieving the optimal switching state and the corresponding rectifier input voltage values $u_\alpha$ and $u_\beta$; in comparison to the input current sampling values $i_{f\alpha}$ and $i_{f\beta}$, the input current observed values $i_{o\alpha}$ and $i_{o\beta}$ of the rectifier are not impacted by the filter delay and are closer to the actual input current value of the rectifier, as such, the impact of the filter delay is compensated.

Compared with the prior art, the advantages of the present invention are:

Without changing the hardware structure, the present invention can effectively eliminate the filter delay impacts on the MPC algorithm via adding filter delay observer. When there exists a long delay in the active front-end rectifier control system, the method still can effectively eliminate the current harmonic, thus improving the control quality and robustness of the system, enhancing the MPC effects in the actual application, and realizing stable operation of the active front-end rectifier based on MPC when there exists a long delay.

DETAILED DESCRIPTION OF THE INVENTION

Figure 1:
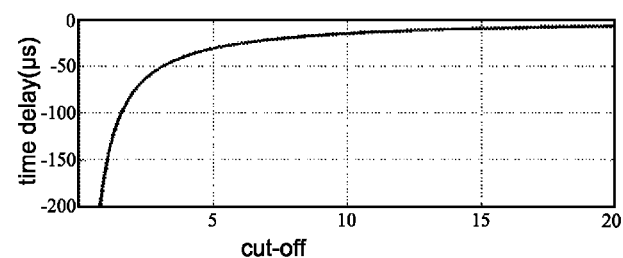
FIG. 1 shows a relational between a first-order filter cut-off frequency and signal delay.

The present invention will be described in detail in combination with the accompanying embodiments.

A filter delay compensation method for an active front-end rectifier based on model predictive control, includes the following steps:

Step 1: detecting a three-phase grid voltage and three-phase input current sampling values of an active front-end rectifier, and transforming both via Clarke transformation to acquire grid voltage sampling values $e_\alpha$ and $e_\beta$, and input current sampling values $i_{f\alpha}$ and $i_{f\beta}$ under a two-phase stationary coordinate system;

Step 2: establishing an equivalent mathematical model of rectifier on the basis of the voltage balancing equation (1) in an actual rectifier;

$$\begin{cases} e_\alpha = u_\alpha + Ri_\alpha + L\dfrac{di_\alpha}{dt} \\ e_\beta = u_\beta + Ri_\beta + L\dfrac{di_\beta}{dt} \end{cases} \quad (1)$$

wherein, $e_\alpha$ and $e_\beta$ are grid voltage sampling values, $i_\alpha$ and $i_\beta$ are input current values of the rectifier; L and R are input inductance values and equivalent series resistance value respectively; $u_\alpha$ and $u_\beta$ are input voltage values of rectifier;

Establishes an equivalent filter model on the basis of the transfer function corresponding to the actual filter, and the ideal transfer function thereof is equation (2) of:

$$F(s) = \frac{b_m s^m + b_{m-1} s^{m-1} + \ldots + b_0}{a_n s^n + a_{n-1} s^{n-1} + \ldots + a_0} \quad (2)$$

wherein, $a_0, a_1 \ldots a_n$ are coefficient of part-denominator of transfer function to the filter; $b_0, b_1 \ldots b_m$ are coefficient of part-numerator of transfer function to the filter; and s is the complex variable of transfer function;

The above equivalent mathematical model of rectifier and equivalent filter model constitute a filter delay observer;

Step 3: taking the grid voltage sampling values $e_\alpha$ and $e_\beta$ acquired by step 1 and the rectifier input voltage values $u_\alpha$ and $u_\beta$ acquired by the last sampling period as the input value of the filter delay observer; and obtaining the equivalent rectifier input current values $i_{o\alpha}$ and $i_{o\beta}$ by equivalent mathematical model of rectifier;

Step 4: putting equivalent rectifier input current values $i_{o\alpha}$ and $i_{o\beta}$ into the equivalent filter model, and obtaining equivalent sampling current values $i_{of\alpha}$ and $i_{of\beta}$;

Step 5: compensating the difference value between the input current sampling values $i_{f\alpha}$ and $i_{f\beta}$ acquired by step 1 and equivalent current sampling values $i_{of\alpha}$ and $i_{of\beta}$ acquired by step 4 into an input of the filter delay observer via a proportional controller;

Step 6: inputting the equivalent rectifier input current values $i_{o\alpha}$ and $i_{o\beta}$ which are regarded as the rectifier input current observed values into the model predictive control algorithm, and achieving the optimal switching state and the corresponding rectifier input voltage values $u_\alpha$ and $u_\beta$; in comparison to the input current sampling values $i_{f\alpha}$ and $i_{f\beta}$, the input current observed values $i_{o\alpha}$ and $i_{o\beta}$ of the rectifier are not impacted by the filter delay and are closer to the actual input current value of the rectifier, as such, the impact of the filter delay is compensated.

The present invention will be described in detail in combination with the accompanying drawings and embodiments.

Figure 2:
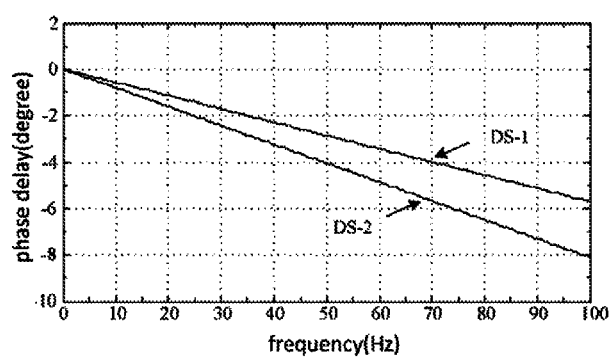
FIG. 2 is a relational diagram of phase delay in different filter order under the cut-off frequency of 1 kHz.

The input filter will result in signal delay while filtering high frequency interference signal. FIG. 1 illustrates a relationship between a first-order filter cut-off frequency and signal delay. As shown in FIG. 1, filter delay increases with the decrease of cut-off frequency. FIG. 2 is a relational diagram of phase delay in different filter order when the cut-off frequency is 1 kHz. It can be seen from FIG. 2 that in comparison to the low order filters, high order filter produces longer delay.

Figure 3:
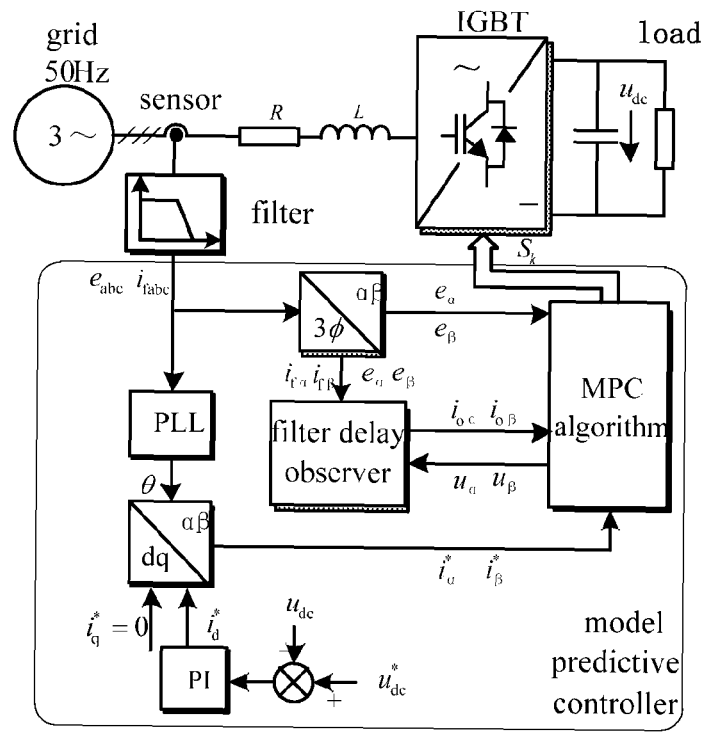
FIG. 3 is a control flow diagram of MPC algorithm based on the filter delay observer.

FIG. 3 is a control flow diagram of MPC algorithm based on the filter delay observer, and the control method includes the following steps:

(1) After sensor measurement, low-pass filter filtering and analog quantity/digital quantity transformation, obtaining the active front-end rectifier three-phase grid voltage sampling values $e_a$ and $e_b$ and $e_c$, three-phase current sampling values $i_{fa}$, $i_{fb}$ and $i_{fc}$, and DC bus voltage sampling value $u_{dc}$;

(2) Transforming the three-phase grid voltage sampling values $e_a$ and $e_b$ and $e_c$, and three-phase input current sampling values $i_{fa}$, $i_{fb}$ and $i_{fc}$ obtained in step (1) via Clarke transformation (3φ/αβ transforming module in FIG. 3) to acquire grid voltage sampling values $e_\alpha$ and $e_\beta$, and input current sampling values $i_{f\alpha}$ and $i_{f\beta}$ under a two-phase stationary coordinate system;

(3) Arranging the three-phase grid voltage sampling values $e_a$ and $e_b$ and $e_c$ such that they pass through phase-locked loop, and achieving grid voltage angle θ;

(4) Performing the operating of subtraction between the DC bus voltage reference value $u_{dc}^*$ and DC bus voltage sampling value $u_{dc}$ acquired by step (1), and the controller obtains the current reference value $i_d^*$ of d-axis in synchronously rotating reference frame via proportional integral. Assuming the current reference value of q-axis is 0, and grid voltage angle as the transforming angle, performing reverse PARK transforming (dq/αβ transforming module in FIG. 3) to current reference value $i_d^*$ and $i_q^*$ of d-axis and q-axis, and to acquire current reference values $i_\alpha^*$ and $i_\beta^*$ under a two-phase stationary coordinate system;

(5) taking the rectifier input voltage values $u_{\alpha\beta}$ computed by the step (6) of the last sampling period, grid voltage sampling values $e_\alpha$ and $e_\beta$ acquired by step (2) and the input current sampling values $i_{f\alpha}$ and $i_{f\beta}$ as the input value of the filter delay observer; and obtaining the rectifier input current observed values $i_{o\alpha}$ and $i_{o\beta}$;

(6) taking the current reference values $i_\alpha^*$ and $i_\beta^*$ acquired by step (4), grid voltage sampling values $e_\alpha$ and $e_\beta$ acquired by step (2) and the rectifier input current observed values $i_{o\alpha}$ and $i_{o\beta}$ acquired by the step (5) as the input values of the MPC algorithm. Regarding to 8 kinds of switching states sequenced from 0 to 7, the rectifier input voltage values $u_\alpha$ and $u_\beta$ and the corresponding optimal switching state signal $S_k$ are obtained according to equations 3 and 4;

$$\begin{cases} i_{\alpha,n}^p(k+1) = \frac{T}{L}[e_\alpha(k) - u_{\alpha,n}(k) - Ri_{o\alpha}(k)] + i_{o\alpha}(k) \\ i_{\beta,n}^p(k+1) = \frac{T}{L}[e_\beta(k) - u_{\beta,n}(k) - Ri_{o\beta}(k)] + i_{o\beta}(k) \end{cases} \quad (3)$$

Wherein, n=0, 1, ..., 7; the values of $i_{\alpha,n}^P(k+1)$ 和 $i_{\beta,n}^P(k+1)$ are the corresponding predicted current values of the 8 kinds of switching states sequenced from 0 to 7 in the next sampling period; T is the sampling period value; L is the input side filter inductance value; and R is the input side equivalent series resistance value.

$$g_n(k+1) = [i_\alpha^*(k+1) - i_{\alpha,n}^P(k+1)]^2 + [i_\beta^*(k+1) - i_{\beta,n}^P(k+1)]^2 \quad (4)$$

Wherein, n=0, 1, ..., 7; the values of $g_n$ (k+1) are the results of the corresponding value function of the 8 kinds of switching states sequenced from 0 to 7.

$$S_k : \min\{g_n(k+1)\}_{n=0,1,\ldots,7} \quad (5)$$

(7) Taking the optimal switching state signal $S_k$ acquired by step (6) as the switching signal of the power device, circulating to step (1) when the next sampling period starts.

Figure 4:
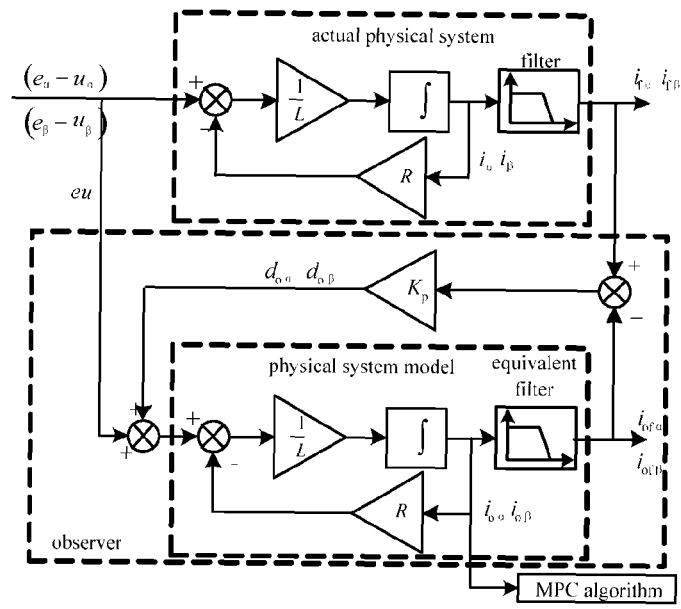
FIG. 4 is a control flow diagram of the filter delay observer.

The filter delay observer in FIG. 3 is shown in FIG. 4. The operation process is as follows:

Assume the grid voltage sampling values $e_\alpha$ and $e_\beta$ are not affected by the filter. In the actual physical system (shown in the dashed box in the upper side of FIG. 3), grid voltage values $e_\alpha$ and $e_\beta$ and rectifier input voltage values $u_\alpha$ and $u_\beta$ act on the actual rectifier to obtain corresponding rectifier input current values $i_\alpha$ and $i_\beta$, the values thereof then achieve the filtered input current sampling values $i_{f\alpha}$ and $i_{f\beta}$ via low-pass filter. In the observer (shown in the dashed box in the bottom side of FIG. 3), make model of the actual physical system to obtain the physical system model comprising equivalent mathematical models of rectifier and filter. The grid voltage values $e_\alpha$ and $e_\beta$ and rectifier input voltage values $u_\alpha$ and $u_\beta$ obtain the equivalent rectifier input current values $i_{o\alpha}$ and $i_{o\beta}$ via equivalent mathematical model of rectifier in the observer, and then obtain equivalent current sampling values $i_{of\alpha}$ and $i_{of\beta}$ of the physical system model via equivalent mathematical model of filter in the observer (namely of equivalent filter module in FIG. 3). In order to use the physical system model as an approximation for the actual physical system, compensate the difference value between the detected actual system current sampling values $i_{f\alpha}$ and $i_{f\beta}$ and equivalent current sampling values $i_{of\alpha}$ and $i_{of\beta}$ acquired by the physical system model into an input of the observer via a proportional controller (shown as Kp module in FIG. 3), to achieve the equivalent rectifier input current values $i_{o\alpha}$ and $i_{o\beta}$ as an approximation for the actual rectifier input current values $i_\alpha$ and $i_\beta$. Therefore, use the equivalent rectifier input current values $i_{o\alpha}$ and $i_{o\beta}$ in place of the filtered input current sampling values $i_{f\alpha}$ and $i_{f\beta}$ as the sampling current values, and input the values into the model predictive control algorithm, thus avoiding the impacts of the filter delay.

The equivalent mathematical model in the observer algorithm approximates actual physical system, and the obtained equivalent rectifier input current values $i_{o\alpha}$ and $i_{o\beta}$ are equivalent to the actual input current values of the rectifier, thus effectively eliminating the sampling delay caused by filter.

Though various embodiments accompanied with drawings of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:
1. A filter delay compensation method for an active front-end rectifier based on model predictive control, comprising the following steps:
   step 1: detecting a three-phase grid voltage and three-phase input current sampling values of an active front-end rectifier, and transforming both via Clarke transformation to acquire grid voltage sampling values $e_\alpha$ and $e_\beta$, and input current sampling values $i_{f\alpha}$ and $i_{f\beta}$ under a two-phase stationary coordinate system;
   step 2: establishing an equivalent mathematical model of rectifier on the basis of the voltage balancing equation (1) in an actual rectifier;

$$\begin{cases} e_\alpha = u_\alpha + Ri_\alpha + L\frac{di_\alpha}{dt} \\ e_\beta = u_\beta + Ri_\beta + L\frac{di_\beta}{dt} \end{cases} \quad (1)$$

wherein, $e_\alpha$ and $e_\beta$ are grid voltage sampling values, $i_\alpha$ and $i_\beta$ are input current values of the rectifier; L and R are input inductance values and equivalent series resistance value respectively; and $u_\alpha$ and $u_\beta$ are input voltage values of rectifier;
   establishing an equivalent filter model on the basis of the transfer function corresponding to the actual filter, wherein the ideal transfer function thereof is equation (2) of:

$$F(s) = \frac{b_m s^m + b_{m-1} s^{m-1} + \ldots + b_0}{a_n s^n + a_{n-1} s^{n-1} + \ldots + a_0} \quad (2)$$

wherein, $a_0, a_1 \ldots a_n$ are coefficient of part-denominator of transfer function to the filter; $b_0, b_1 \ldots b_m$ are coefficient of part-numerator of transfer function to the filter; and s is the complex variable of transfer function;
   the above equivalent mathematical model of rectifier and equivalent filter model constitute a filter delay observer;
   step 3: taking the grid voltage sampling values $e_\alpha$ and $e_\beta$ acquired by step 1 and the rectifier input voltage values $u_\alpha$ and $u_\beta$ acquired by the last sampling period as the input value of the filter delay observer; and obtaining the equivalent rectifier input current values $i_{o\alpha}$ and $i_{o\beta}$ by equivalent mathematical model of rectifier;
   step 4: putting equivalent rectifier input current values $i_{o\alpha}$ and $i_{o\beta}$ into the equivalent filter model, and obtaining equivalent sampling current values $i_{of\alpha}$ and $i_{of\beta}$;
   step 5: compensating the difference value between the input current sampling values $i_{f\alpha}$ and $i_{f\beta}$ acquired by step 1 and equivalent current sampling values $i_{of\alpha}$ and $i_{of\beta}$ acquired by step 4 into an input of the filter delay observer via a proportional controller;

step 6: inputting the equivalent rectifier input current values $i_{o\alpha}$ and $i_{o\beta}$ which are regarded as the rectifier input current observed values into the model predictive control algorithm, and achieving the optimal switching state and the corresponding rectifier input voltage values $u_\alpha$ and $u_\beta$; in comparison to the input current sampling values $i_{f\alpha}$ and $i_{f\beta}$, the input current observed values $i_{o\alpha}$ and $i_{o\beta}$ of the rectifier are not impacted by the filter delay and are closer to the actual input current value of the rectifier such that the impact of the filter delay is compensated.

\* \* \* \* \*